(12) United States Patent
Cardinal et al.

(10) Patent No.: US 9,964,132 B2
(45) Date of Patent: May 8, 2018

(54) QUICK HOOK

(71) Applicants: Bernard Cole Realty Corporation, Newmarket (CA); Henri Cardinal, Ottawa (CA)

(72) Inventors: Henri Cardinal, Ottawa (CA); Gilbert Gelineau, Etobicoke (CA)

(73) Assignees: Bernard Cole Realty Corporation, Newmarket, ON (CA); Henri Cardinal, Ottawa, ON (CA)

( * ) Notice: Subject to any disclaimer, the term of this patent is extended or adjusted under 35 U.S.C. 154(b) by 0 days. days.

(21) Appl. No.: 15/463,376

(22) Filed: Mar. 20, 2017

(65) Prior Publication Data
US 2017/0276158 A1    Sep. 28, 2017

Related U.S. Application Data

(60) Provisional application No. 62/311,557, filed on Mar. 22, 2016.

(51) Int. Cl.
*F16B 7/02* (2006.01)

(52) U.S. Cl.
CPC ................................. *F16B 7/02* (2013.01)

(58) Field of Classification Search
CPC .......................................................... F16B 7/02
USPC .............................. 294/82.1, 82.11
See application file for complete search history.

(56) References Cited

U.S. PATENT DOCUMENTS

| 721,968 | A | 3/1903 | Round |
| 1,576,986 | A | 3/1926 | Mullen |
| 1,957,943 | A | 5/1934 | Delano et al. |
| 2,261,963 | A | 11/1941 | Coffing |
| 2,548,846 | A | 4/1951 | Robins et al. |
| 2,998,277 | A | 8/1961 | Himel, Jr. |
| 3,092,369 | A | 6/1963 | Carroll |
| 3,154,115 | A | 10/1964 | Busl |
| 5,586,801 | A | 12/1996 | Sawyer et al. |
| 5,971,178 | A | 10/1999 | Ratcliff et al. |
| 6,375,380 | B1 * | 4/2002 | Snyder ..................... B66D 3/14 294/81.1 |
| 6,652,012 | B1 * | 11/2003 | Fuller ....................... B66C 1/66 294/215 |
| 6,675,546 | B2 * | 1/2004 | Coles ...................... F16B 7/185 403/157 |

(Continued)

FOREIGN PATENT DOCUMENTS

WO    WO-9400699 A1 *  1/1994  ........... A01G 9/1407

*Primary Examiner* — Stephen Vu

(74) *Attorney, Agent, or Firm* — Norton Rose Fulbright Canada LLP

(57) ABSTRACT

An adapter for anchoring an object to an existing support structure comprises: a securing block comprising a first inner block, a second inner block complementary to the first inner block, the first and second inner blocks defining a channel therethrough when placed in opposition for receiving and securing to the existing support structure, the first inner block comprising a first securing means and the second inner block comprising a second securing means; and an outer sleeve for coupling to the securing block, having: an opening to receive the existing support structure; a sleeve channel for receiving the securing block; and an attachment arm attached to an outer surface of the outer sleeve for anchoring the object.

15 Claims, 14 Drawing Sheets

(56) References Cited

U.S. PATENT DOCUMENTS

| | | | | |
|---|---|---|---|---|
| 6,676,112 B2* | 1/2004 | Dorr | ............................ | B66C 1/54 |
| | | | | 254/323 |
| 7,887,354 B2* | 2/2011 | Holliday | .............. | H01R 13/622 |
| | | | | 439/277 |
| 8,763,993 B2* | 7/2014 | Bohler | ....................... | B66C 1/34 |
| | | | | 254/390 |
| 2013/0181177 A1 | 7/2013 | Moll | | |
| 2014/0353563 A1 | 12/2014 | Sargent | | |

* cited by examiner ic, cylindrical, and the like. As depicted in FIG. 1 and FIG.
QUICK HOOK

CROSS-REFERENCE TO RELATED APPLICATIONS

This application claims priority from U.S. provisional patent application no. 62/311,557, filed Mar. 22, 2016, the entire contents of which are incorporated herein by reference.

FIELD

This relates to the field of mechanical tools, and in particular, to an adapter for attaching objects to existing support structures.

BACKGROUND

In many industries, such as the construction, demolition, and maintenance industries, it may be necessary to move objects, such as by lifting, lowering, or suspending them. For example, when installing a new machine, the old machine may need to be removed and the new machine brought proximate to the location where it will be installed. This may require lowering or lifting the old machine and corresponding lifting or lowering the new machine.

However, it may be difficult for certain objects to be lifted, lowered, or suspended. The objects may be heavy, difficult to securely grasp, or unsafe to grasp for any prolonged period of time. Further, it may not be safe for one person or multiple people to physically lift, lower, or suspend objects. In addition, even if the objects were light weight and safe to grasp, the objects may not be easily accessible. For example, the object may be behind other objects or otherwise out of reach, such as near the ceiling.

One way to move objects is to use lifting devices. Various lifting devices have been developed for lifting, lowering, or suspending objects, such as chain hoists, electric hoists, block and tackles, and lifting beams.

Such lifting devices may need to be secured above the object to be lifted, such as to the ceiling. Each time a lifting device is required for use, it may require drilling new holes into a concrete ceiling and installing a support structure, such as an eyebolt, to provide an attachment point to anchor the lifting device. Unfortunately, drilling holes and installing support structures into a concrete ceiling tend to be cumbersome and time consuming. Exposed ends of existing support structures may be inaccessible because they are already anchoring an object. Moreover, future construction or installations may block or impede access to the existing support structures, like a pipe being installed adjacent to the eyelet of an eyebolt, such that the existing support structures may not be reused to anchor a lifting device.

SUMMARY

An example adapter for anchoring an object to an existing support structure comprises: a securing block comprising a first inner block, a second inner block complementary to the first inner block, the first and second inner blocks defining a channel therethrough when placed in opposition for receiving and securing to the existing support structure, the first inner block comprising a first securing means and the second inner block comprising a second securing means; and an outer sleeve for coupling to the securing block, having: an opening to receive the existing support structure; a sleeve channel for receiving the securing block; and an attachment arm attached to an outer surface of the outer sleeve for anchoring the object.

An example adapter for anchoring an object to an existing support structure, the adapter comprising: a first adapter block opposing a second adapter block in hinged connection defining a channel therethrough for receiving and securing to the existing support structure, the first adapter block comprising a first securing means and the second inner block comprising a second securing means; and an attachment arm attached to an outer surface of the adapter for anchoring the object.

BRIEF DESCRIPTION OF DRAWINGS

In the figures which illustrate example embodiments.

DETAILED DESCRIPTION

Figure 1:
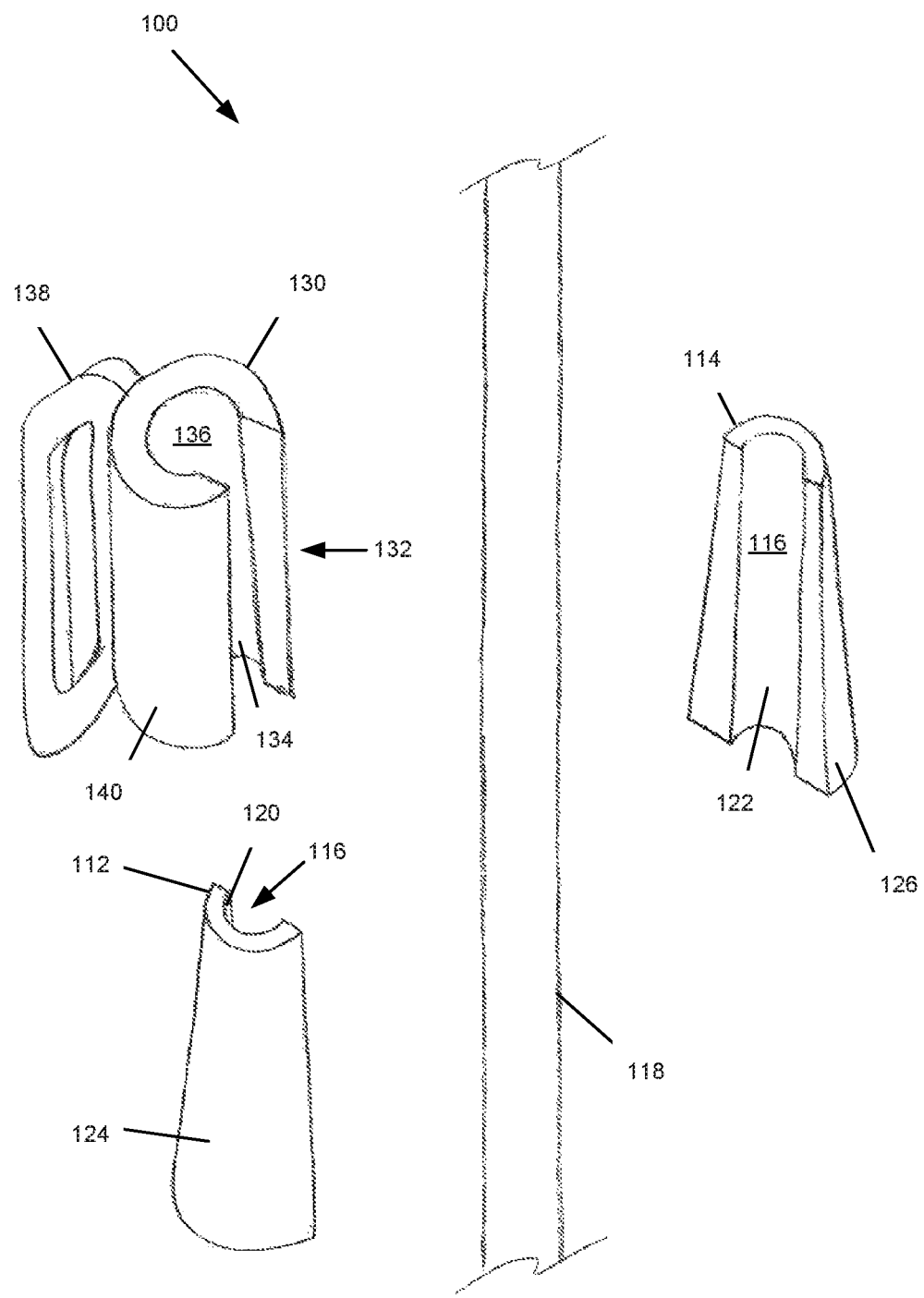
FIG. 1 is an exploded view of an adapter with a securing block and an outer sleeve.
Figure 2:
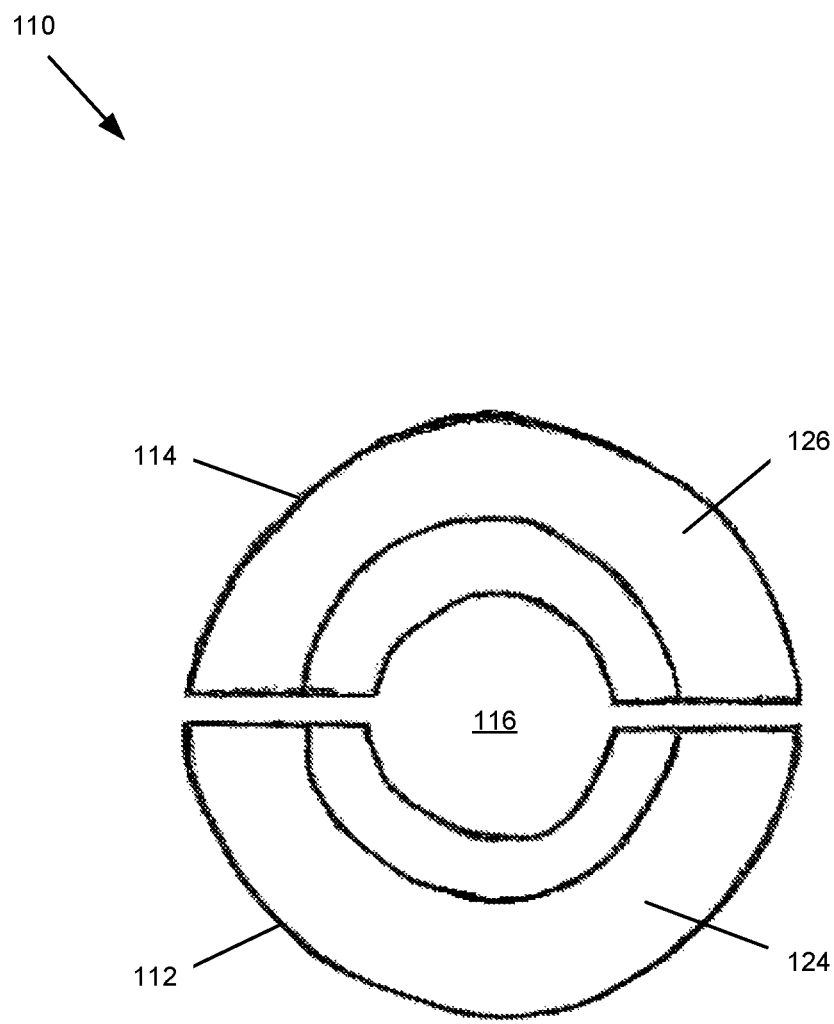
FIG. 2 is a top view of the securing block of FIG. 1.

Reference is made to FIG. 1 and FIG. 2. FIG. 1 is an exploded view of an adapter 100, which may be secured to an existing support structure for anchoring an object to the existing support structure. Adapter 100 may comprise a securing block 110 and an outer sleeve 130.

Securing block 110 may comprise a first inner block 112 and a second inner block 114. When first inner block 112 and second inner block 114 are positioned in opposition, they may define a channel 116 for receiving and securing to an existing support structure 118.

First inner block 112 and second inner block 114 may be complementary to each other. As shown in FIG. 1 and FIG. 2, first inner block 112 and second inner block 114 may generally be similar to each other. In some embodiments, first inner block 112 and second inner block 114 may be different shapes and geometries.

As depicted in FIG. 1 and FIG. 2, securing block 110 may have a tapered shape such as a frustoconical shape. In some embodiments, securing block 110 may have a different shape, such as a cylinder, cone, triangle, square, pyramid, hexagon, octagon, and the like.

In some embodiments, channel 116 may have a shape corresponding to the shape of existing support structure 118, such as conical, pyramidal, rectangular, hexagonal, octagonal, cylindrical, and the like. As depicted in FIG. 1 and FIG.

2, channel 116 may be generally cylindrical for receiving a generally cylindrical existing support structure 118, such as a threaded rod.

Channel 116 may be sized such that channel 116 may accommodate the size of existing support structure 118. For example, when existing support structure 118 is a threaded metal rod, channel 116 may be sized to accommodate standard diameters of threaded metal rods. In some examples, channel 116 may be sized to accommodate threaded metal rods with diameter ranging from 3/16 inches to 10 inches. In some examples, channel 116 may be sized to accommodate threaded rods with diameter ranging from 3/16 inches to 2 inches. The edges of channel 116 may be bevelled, rounded, chamfered, or otherwise smoothed for holding, gripping, or securing of securing block 110 and for receiving existing support structure 118.

Existing support structure 118 may be any appropriate support structure for anchoring an object, such as metal rods, pipes, beams, and the like. In some embodiments, existing support structure 118 may be a threaded metal rod secured at one end to a ceiling.

First inner block 112 may comprise a first securing means 120 for securing first inner block 112 to existing support structure 118. Similarly, second inner block 114 may comprise a second securing means 122 for securing second inner block 114 to existing support structure 118. First securing means 120 and second securing means 122 may be any appropriate securing device for securing first inner block 112 and second inner block 114 to existing support structure 118, such as nails, screws, adhesives, mating surfaces for mating with existing support structure 118, and the like. In some embodiments, when existing support structure 118 is a threaded metal rod, first securing means 120 and second securing means 122 may be threaded surfaces with threads corresponding to the threads on existing support structure 118.

First inner block 112 may comprise a first outer surface 124. Similarly, second inner block 114 may comprise a second outer surface 126. First outer surface 124 and second outer surface 126 may be smoothed or polished for contacting outer sleeve 130 when adapter 100 is in use.

First inner block 112 and/or second inner block 114 may be manufactured using appropriate manufacturing techniques. For example, first inner block 112 and/or second inner block 114 may be cast, forged, 3D-printed, or machined entirely or partially from an appropriate material, such as stainless steel, aluminum, titanium, and the like.

Figure 3:
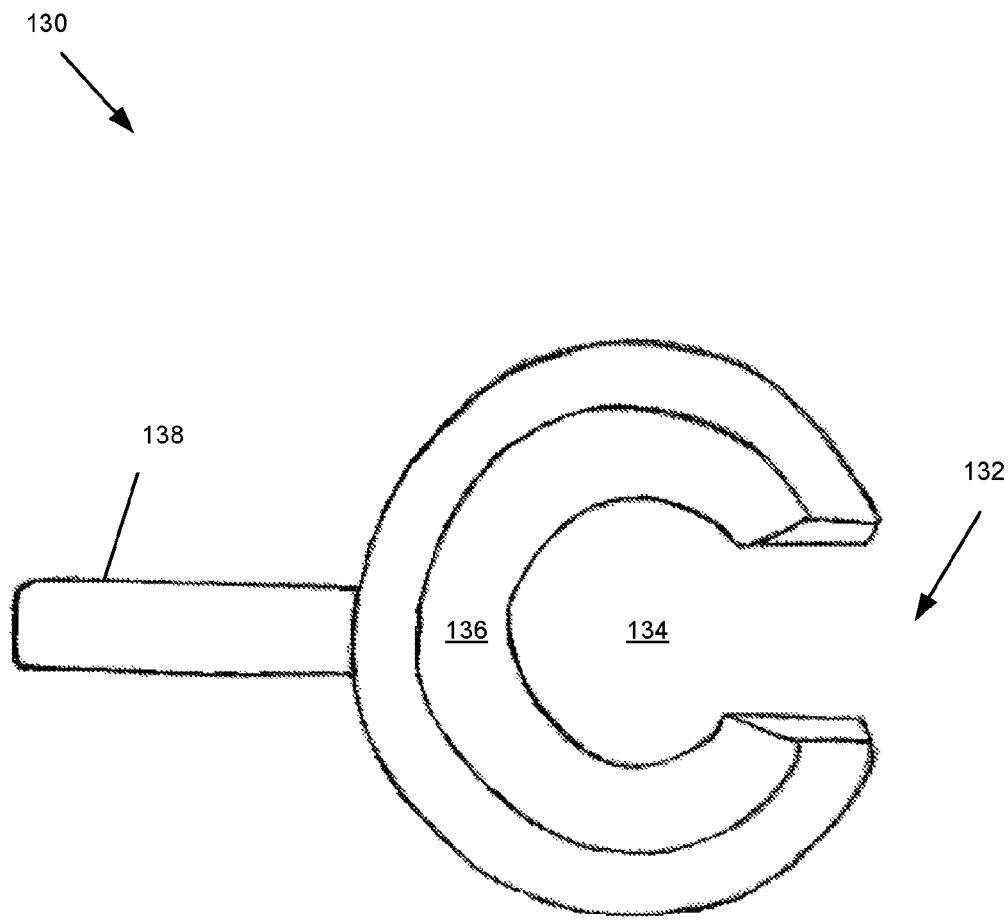
FIG. 3 is a bottom view of the outer sleeve of FIG. 1.

Outer sleeve 130 may comprise an opening 132, a sleeve channel surface 134 defining a sleeve channel 136, and an attachment arm 138 attached to an outer surface 140 of outer sleeve 130. In some embodiments, outer sleeve 130 may have a shape for ease of holding, grasping, or securing of outer sleeve 130. As shown in FIG. 1 and FIG. 3, outer sleeve 130 may have a generally round shape.

As depicted in FIG. 1 and FIG. 3, opening 132 may be an opening that may extend along the entire body of outer sleeve 130 such that the length of opening 132 may generally be the same as the length of the body of outer sleeve 130. In some embodiments, opening 132 may extend partially along outer sleeve 130 such that the length of opening 132 may be shorter than the length of the body of outer sleeve 130. Opening 132 may be sized for receiving existing support structure 118 and/or a securing block such as securing block 110.

Sleeve channel surface 134 defining sleeve channel 136 may be smoothed, polished or otherwise processed for contacting securing block 110 when adapter 100 is in use.

Based on the shape and size of securing block 110, sleeve channel 136 may be similarly shaped and sized for receiving and coupling with securing block 110. For example, as illustrated in FIG. 1 and FIG. 2, securing block 110 may have a generally frustoconical shape with tapered first outer surface 124 and tapered second outer surface 126. Sleeve channel 136 may be similarly tapered, as illustrated in FIG. 1 and FIG. 3, for receiving and coupling with securing block 110.

In some embodiments, the width of opening 132 may be shorter than the width of sleeve channel 136.

Attachment arm 138 may allow an object to be attached to adapter 100 so that the object may be anchored to existing support structure 118. For example, attachment arm 138 may be an appropriate device for an object to attach to adapter 100, such as a cantilevered beam, rod, eyelet, and the like. As illustrated in FIG. 1 and FIG. 3, attachment arm 138 may be a hoop for coupling with objects, such as lifting devices.

Outer sleeve 130 may be manufactured using appropriate manufacturing techniques. For example, outer sleeve 130 may be cast, forged, 3D-printed, or machined entirely or partially from an appropriate material, such as stainless steel, aluminum, titanium, and the like. In some embodiments, attachment arm 138 may be separately cast, forged, 3D-printed, machined or otherwise manufactured and then later fastened to outer surface 140 of outer sleeve 130 using appropriate fasteners, such as nuts and bolts, screws, adhesives, or welding.

Figure 14:
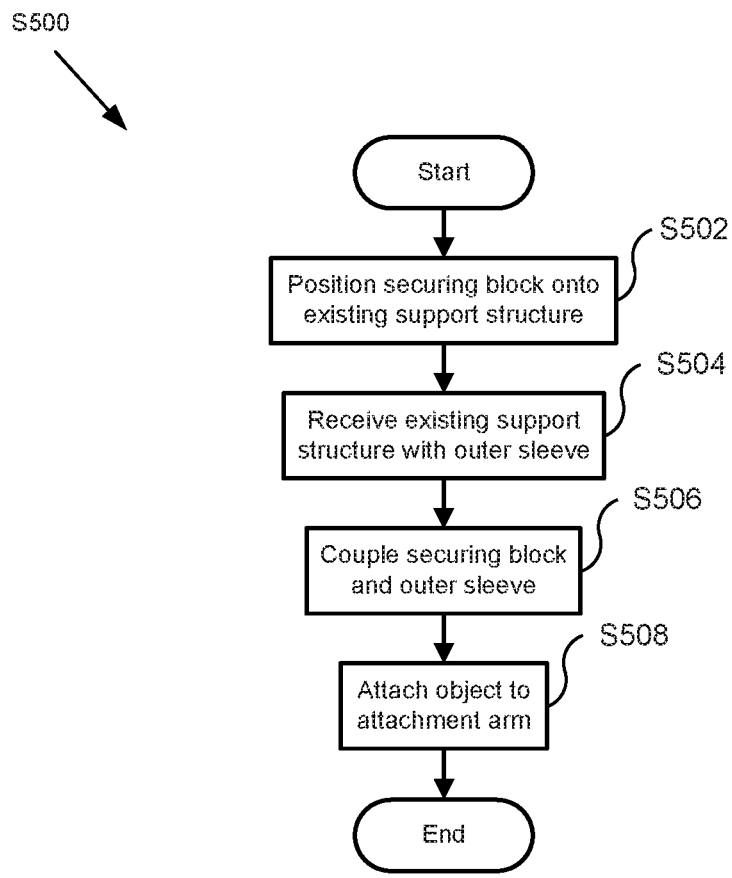
FIG. 14 is a flow chart depicting a method of using an adapter.

FIG. 14 depicts a process S500 for using example adapter 100 for anchoring an object to an existing support structure. Process S500 may be applied using other embodiments of adapter 100, securing block 110, and/or outer sleeve 130 as described below. In some embodiments, process S500 may be applied to a newly installed support structure.

At block S502, securing block 110 may be positioned onto existing support structure 118. First securing means 120 and second securing means 122 may secure securing block 110 to existing support structure 118. In some embodiments, a user may hold securing block 110 onto existing support structure 118.

At block S504, outer sleeve 130 may receive existing support structure 118 through opening 132.

At block S506, securing block 110 and outer sleeve 130 may be coupled. In some embodiments, securing block 110 and outer sleeve 130 may be slidably coupled. Outer sleeve 130 may couple with securing block 110 and may cause first securing means 120 and second securing means 122 to secure securing block 110 to existing support structure 118.

Figure 4:
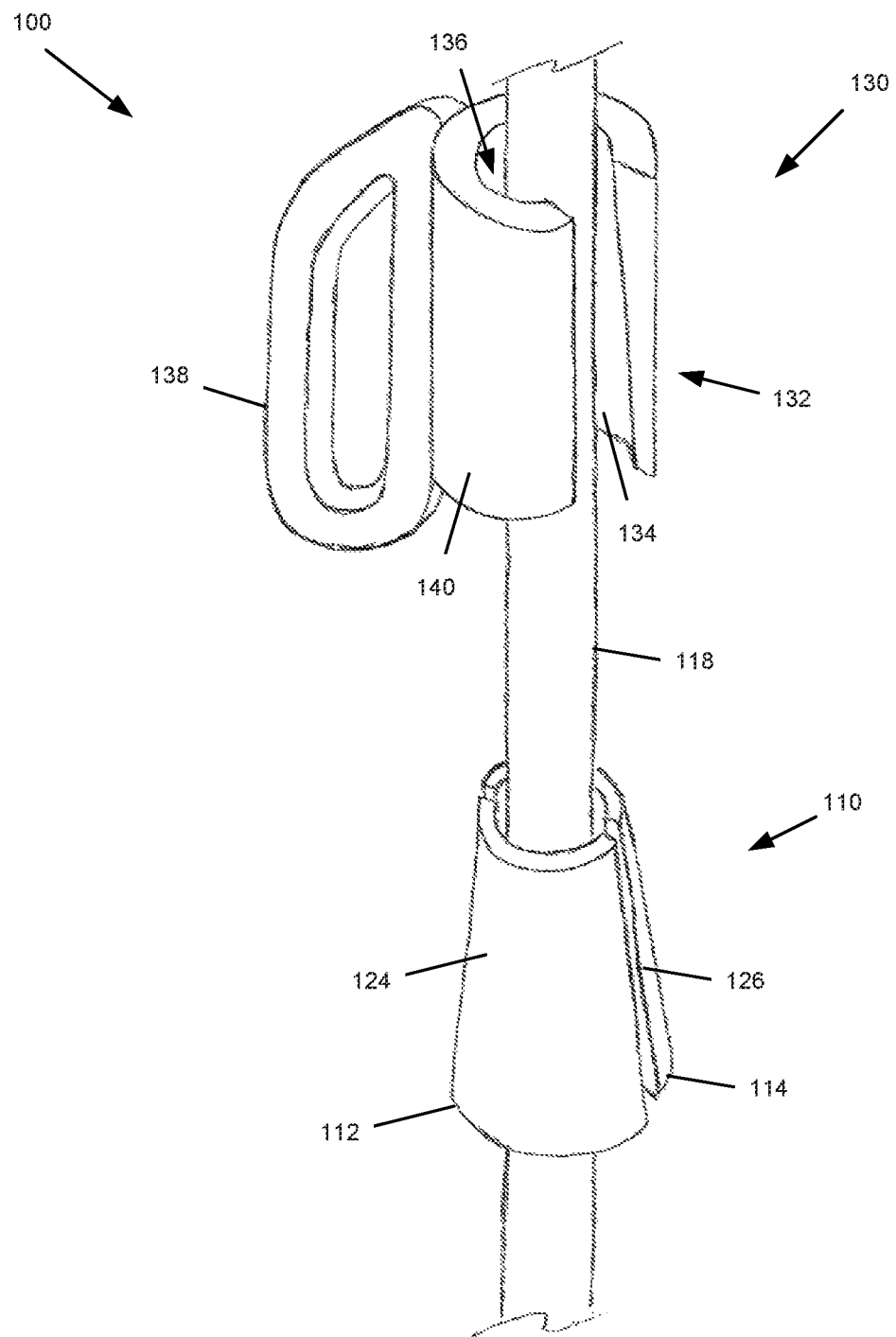
FIG. 4 is a schematic view of the outer sleeve and securing block of FIG. 1 configured for securing to an existing support structure.
Figure 5:
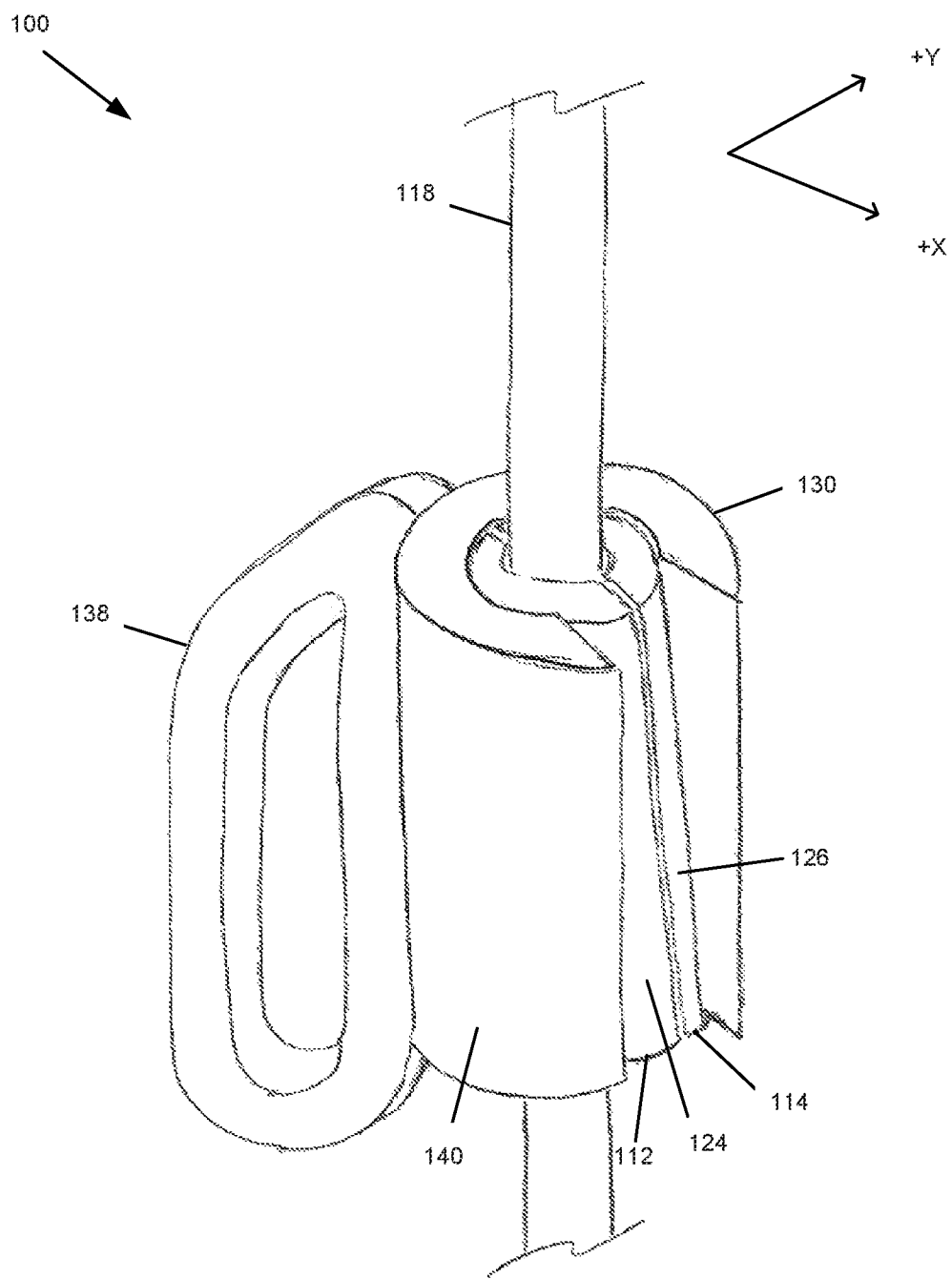
FIG. 5 is a schematic view of the adapter of FIG. 1 secured to an existing support structure.

In some embodiments, as depicted in FIG. 4, securing block 110 may have tapered sides, and sleeve channel 136 of outer sleeve 130 may be similarly tapered. When outer sleeve 130 and securing block 110 are coupled as shown in FIG. 5, tapered sleeve channel surface 134 may be in contact with tapered first outer surface 124 and tapered second outer surface 126, such that the weight of outer sleeve 130 may cause first inner block 112 and second inner block 114 to press against existing support structure 118 and may promote engagement between first securing means 120 and second securing means 112 and existing support structure 118.

In some embodiments, existing support structure 118 may be a threaded rod and first securing means 120 and second securing means 122 may be threaded surfaces. When outer sleeve 130 is coupled with securing block 110, the threads of existing support structure 118 may engage and/or maintain engagement with the threads of the first securing means 120 and second securing means 122, such that adapter 100 is secured to existing support structure 118.

In some embodiments, when outer sleeve 130 comprising tapered sleeve channel 136 is slidably coupled with securing block 110 comprising tapered outer surfaces 124, 126, outer sleeve 130 may be prevented from sliding past securing block 110.

At block S508, an object, such as a lifting device, may be attached to attachment arm 138 such that the object is anchored to existing support structure 118. For example, a hook of a chain hoist may be hooked into the loop of attachment arm 138 to anchor the chain hoist to existing support structure 118, such as a threaded rod.

When an object is attached to attachment arm 138, outer sleeve 130 may be prevented from uncoupling with securing block 110 as the width of opening 132 may be shorter than the width of sleeve channel 136.

When an object is anchored to existing support structure 118 using adapter 100, the object may be used. For example, a lifting device, such as a chain hoist, anchored to a threaded rod using adapter 100 may be used to lift, lower, and/or suspend another object.

In some embodiments, adapter 100 may be used to anchor an object to an existing support structure, such as anchoring a lifting device to an existing threaded rod.

First inner block 112 and second inner block 114 may be positioned onto existing support structure 118 such that existing supporting structure 118 is received in channel 116 of securing block 110. First inner block 112 and second inner block 114 may be positioned on an appropriate portion of existing support structure 118, such as a proximal, middle, and/or distal portion of existing support structure 118. First securing means 120 and/or second securing means 122 may secure first inner block 112 and second inner block 114 onto existing support structure 118, or a user may hold first inner block 112 and second inner block 114 against existing support structure 118. Outer sleeve 130 may receive existing support structure 118 through opening 132. Outer sleeve 130 may couple with securing block 110 and may cause first securing means 120 and second securing means 122 to secure securing block 110 to existing support structure 118.

An object, such as a lifting device, may be attached to attachment arm 138 such that the object is anchored to existing support structure 118. For example, a hook of a chain hoist may be hooked into the loop of attachment arm 138, as illustrated in FIG. 5, to anchor the chain hoist to existing support structure 118, such as a threaded rod.

When an object is attached to attachment arm 138, outer sleeve 130 may be prevented from uncoupling with securing block 110 as the width of opening 132 may be shorter than the width of sleeve channel 136.

As depicted in FIG. 4 and FIG. 5, outer sleeve 130 may slidably couple with securing block 110.

In some embodiments, as depicted in FIG. 4, securing block 110 may have tapered sides, and sleeve channel 136 of outer sleeve 130 may be similarly tapered. For example, securing block 110 may have a frustoconical shape. When outer sleeve 130 and securing block 110 are coupled as shown in FIG. 5, tapered sleeve channel surface 134 may be in contact with tapered first outer surface 124 and tapered second outer surface 126, such that the weight of outer sleeve 130 may cause first inner block 112 and second inner block 114 to press against existing support structure 118 and may promote engagement between first securing means 120 and second securing means 122 and existing support structure 118.

In some embodiments, existing support structure 118 may be a threaded rod and first securing means 120 and second securing means 122 are threaded surfaces. Where existing support structure 118 is a threaded rod, and first securing means 120 and second securing means 122 are threaded surfaces, when outer sleeve 130 is coupled with securing block 110, the threads of existing support structure 118 may engage and/or maintain engagement with the threads of the first securing means 120 and second securing means 122, such that adapter 100 is secured to existing support structure 118.

In some embodiments, when outer sleeve 130 and securing block 110 are coupled, outer sleeve 130 may be prevented from sliding past securing block 110.

In some embodiments, adapter 100 may be used to anchor an object, such as a lifting device, to a newly installed support structure or to an existing support structure. When adapter 100 is used to anchor an object to an existing support structure, this may reduce the amount of effort and/or time for moving an object since a new support structure may not be installed. For example, adapter 100 may be secured to a newly installed threaded rod in a ceiling to anchor a lifting device to the newly installed threaded rod. This may require time and effort to install the new threaded rod in the ceiling prior to moving the object. When adapter 100 is secured to an existing threaded rod in a ceiling to anchor a lifting device without having to install a new threaded rod, this may save the time and/or effort that would be allocated to installing the new threaded rod.

In some embodiments, adapter 100 may be used to secure onto any appropriate portion of an existing support structure. For example, adapter 100 may be used to secure to a proximal, distal, or middle portion of existing support structure 118, as shown in FIG. 4 and FIG. 5.

In some embodiments, adapter 100 may be used when a portion of an existing support structure is obscured, blocked, and/or impeded. For example, existing support structure 118 may be a threaded rod installed in a concrete ceiling. Adapter 100 may be secured onto an exposed end of the threaded rod. However, the exposed end of the threaded rod may be obscured, blocked, and/or impeded, for example, by new construction or installation projects. Adapter 100 may be secured to a portion of the threaded rod that is not obscured, blocked, and/or impeded for anchoring an object to the threaded rod.

In some embodiments, adapter 100 may be secured to a portion of an existing support structure at an orientation convenient for the user. The orientation of adapter 100 may not be limited or restricted during use. Securing block 110 may receive and secure to any appropriate surface of existing support structure 118. For example, where existing support structure 118 is a threaded rod, securing block 118 may be positioned on any appropriate and convenient surface of existing support structure 118. As depicted in FIG. 5, first outer surface 124 is generally facing in the negative direction of the Y-axis, and second outer surface 126 is generally facing in the positive direction of the Y-axis. In some embodiments, securing block 110 may be rotated about the X-Y plane, such that first outer surface 124 and second outer surface 126 is generally facing any appropriate direction that is preferable to a user of adapter 100. Similarly, outer sleeve 130 may receive and couple with securing block 110 at any appropriate and convenient orientation for the user. As depicted, attachment arm 138 may be oriented along the X-axis and be generally pointed in the negative direction of the X-axis, as shown in FIG. 5. However, attachment arm 138 may be generally pointed in any direction on the X-Y plane at any appropriate and convenient direction to the user.

As described above and shown in FIG. 1 and FIG. 2, securing block 110 of adapter 100 may comprise a first inner block 112 and a second inner block 114. When first inner block 112 and second inner block 114 are positioned in opposition, they may define a channel 116 for receiving and securing block 110 to an existing support structure 118. First inner block 112 and second inner block 114 may not be in physical contact with each other.

Figure 6:
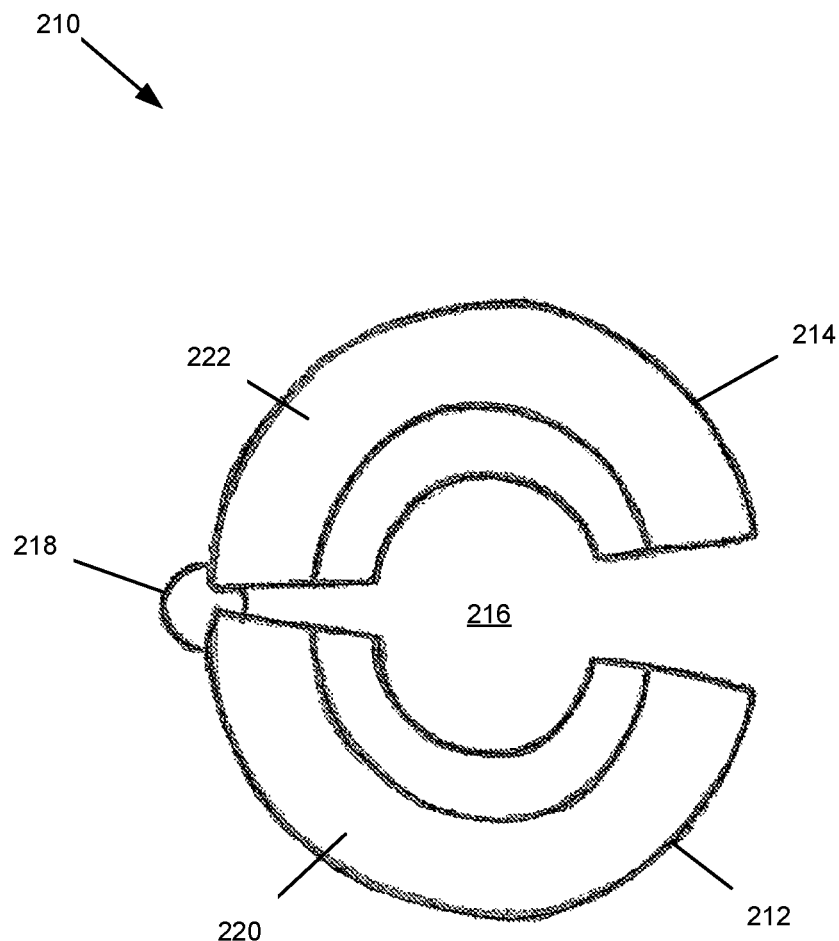
FIG. 6 is a top view of another securing block.
Figure 7:
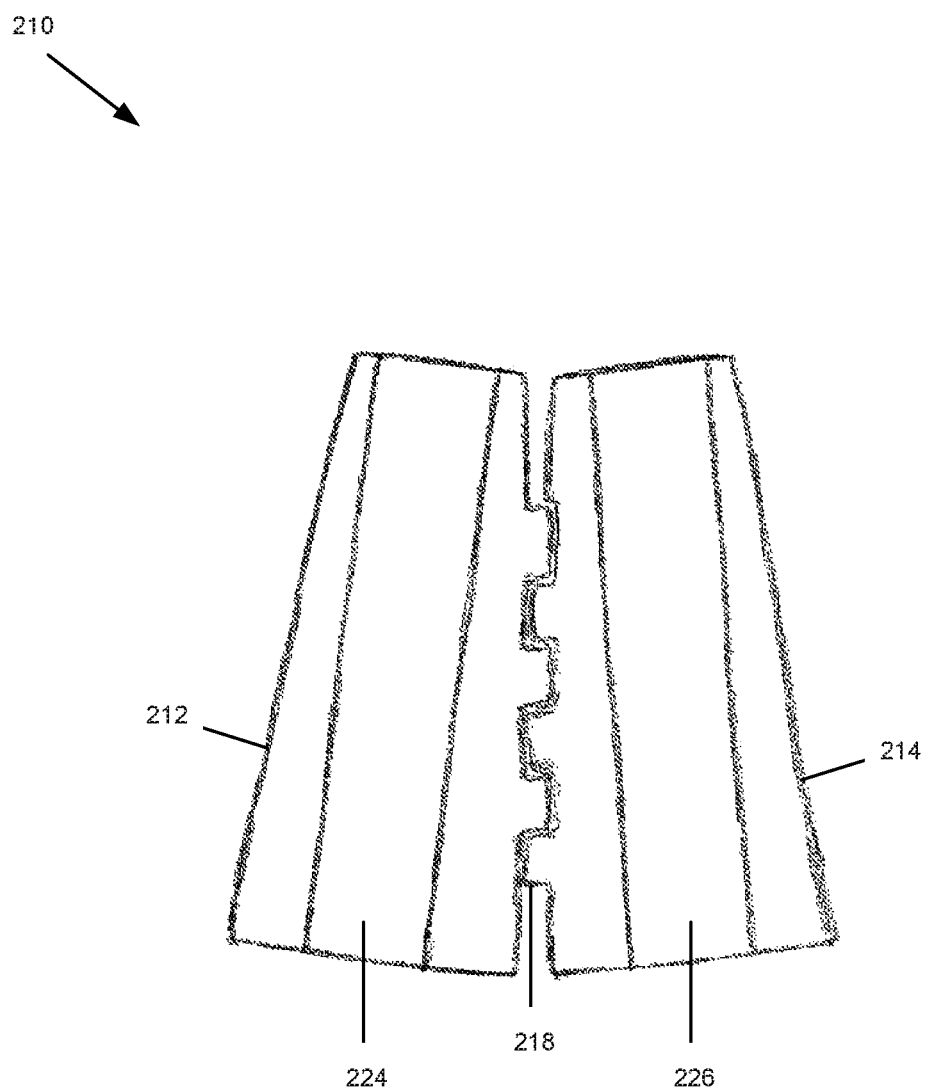
FIG. 7 is a front view of the securing block of FIG. 6.

Other securing blocks are possible. FIG. 6 and FIG. 7 illustrate an example securing block 210 similar to securing block 110, securing block 210 comprising a first inner block 212 and a second inner block 214 pivotable about a hinge connection 218. When first inner block 212 and second inner block 214 are positioned in opposition, they may define a channel 216 for receiving and securing block 210 to existing support structure 118.

In some embodiments, similar to channel 116 of securing block 110, channel 216 may have a shape corresponding to the shape of existing support structure 118. As depicted in FIG. 6 and FIG. 7, channel 216 may be generally cylindrical for receiving a generally cylindrical existing support structure 118, such as a threaded rod.

Similar to channel 116, channel 216 may be sized such that channel 216 may accommodate the size of existing support structure 118.

As shown in FIG. 6, first inner block 212 and second inner block 214 may be connected to each other with hinge connection 218. Hinge connection 218 may be any appropriate hinge connection, such as a hinge and a pin, a spring hinge loaded to close, and the like. Where hinge connection 218 is a spring hinge loaded to close, securing block 210 may be biased towards a closed position.

Hinge connection 218 may cause securing block 210 to pivotably open and close about hinge connection 218. Securing block 210 may pivotably open at hinge connection 218 to receive existing support structure 118 and may close at hinge connection 218 to secure securing block 210 to existing support structure 118. In some embodiments, securing block 210 may be threaded from an exposed end of existing support structure 118 to secure onto existing support structure 118, for example, when existing support structure 118 is a threaded rod. Hinge connection 218 may promote securing first inner block 212 and second inner block 214 to existing support structure 118 such that securing block 210 may remain closed and may continue to be secured to existing support structure 118 when an object is attached to adapter 100.

Securing block 210 may comprise a first outer surface 220 and a second outer surface 222 that may contact sleeve channel surface 134 of outer sleeve 130 when coupled with outer sleeve 130 during use of adapter 100.

Securing block 210 may comprise a first securing means 224 and a second securing means 226 generally similar to first securing means 120 and second securing means 122 of securing block 110.

When first inner block 212 and second inner block 214 are connected to each other, such as with hinge connection 218, it may promote convenience when using adapter 100.

For example, when positioning securing block 210 onto existing support structure 118, a user may not have to press securing block 210 against existing support structure 118. Hinge connection 218 may allow securing block 210 to rest on and/or secure to existing support structure 118. This may promote ease of coupling outer sleeve 130 to securing block 210, since a user of adapter 100 may have both hands free.

As another example, when first inner block 212 and second inner block 214 are connected to each other, it may promote ease of positioning first inner block 212 in opposition with second inner block 214 to define channel 216 for securing block 210 to receive and secure with existing support structure 118.

As yet another example, when first inner block 212 and second inner block 214 are connected to each other, the components of securing block 210 may be retrieved conveniently. When a user retrieves first inner block 212 or second inner block 214, the user may have all the components of securing block 210 when first inner block 212 and second inner block 214 are connected to each other.

As described above in FIG. 1 and FIG. 3, outer sleeve 130 may comprise opening 132, sleeve channel surface 134 defining sleeve channel 136, and attachment arm 138 attached to outer surface 140 of outer sleeve 130.

Figure 8:
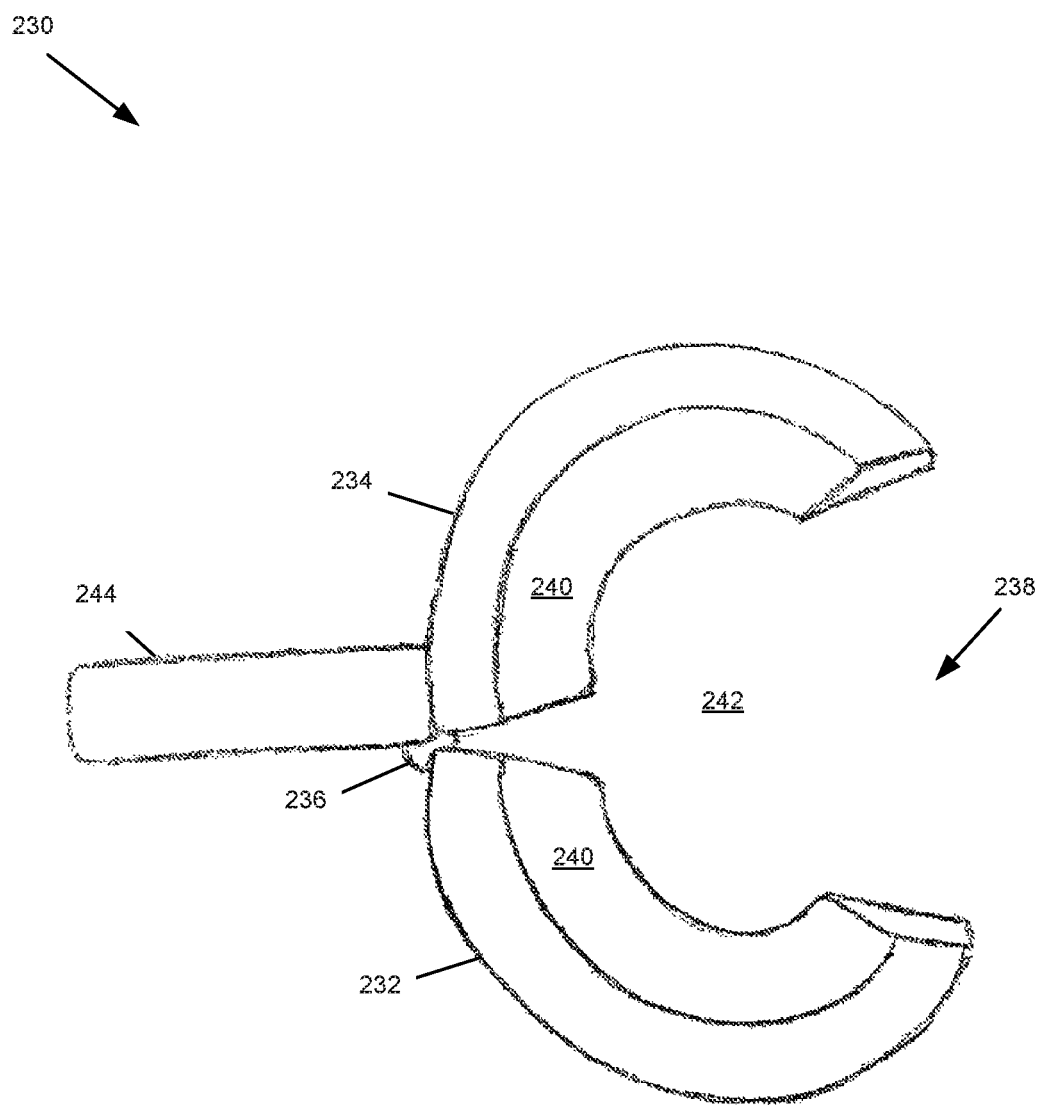
FIG. 8 is a bottom view of another outer sleeve.
Figure 9:
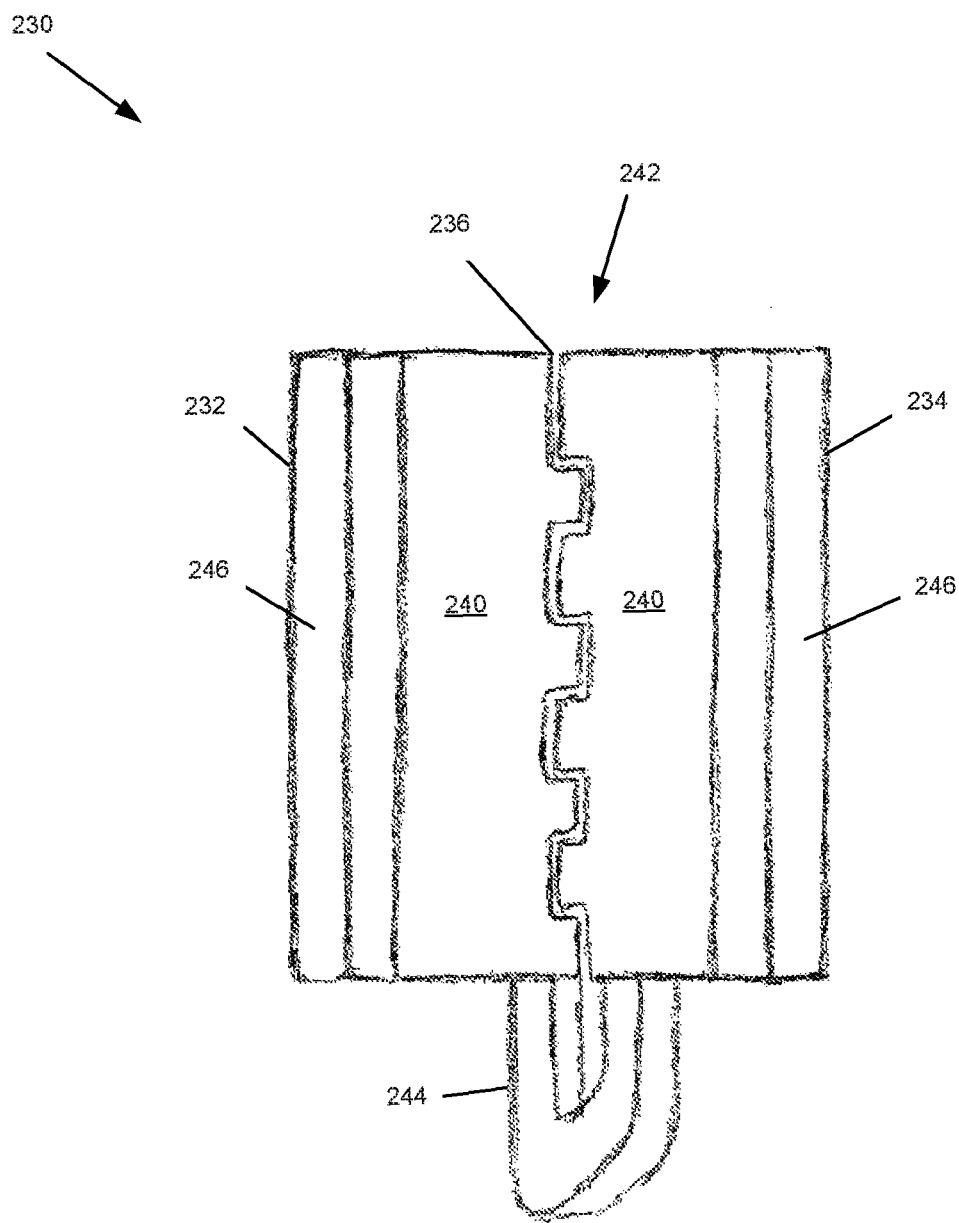
FIG. 9 is a front view of the outer sleeve of FIG. 8.

Other outer sleeves are possible. FIG. 8 and FIG. 9 depict an example outer sleeve 230 that may be similar to outer sleeve 130. Outer sleeve 230 may be coupled with a securing block, such as securing blocks 110, 210, for anchoring an object to existing support structure 118.

Outer sleeve 230 may comprise a first outer sleeve block 232 and a second outer sleeve block 234 connected with a hinge connection 236. Outer sleeve 230 may further comprise an opening 238, a sleeve channel surface 240 defining a sleeve channel 242, and an attachment arm 244 attached to an outer surface 246 of outer sleeve 230. In some embodiments, outer sleeve 230 may have a shape for ease of holding, grasping, or securing of outer sleeve 230. As shown in FIG. 8 and FIG. 9, outer sleeve 230 may have a generally round shape.

Hinge connection 236 may cause outer sleeve 230 to pivotably open and close about hinge connection 236. In some embodiments, hinge connection 236 may be any appropriate hinge connection, such as a hinge and a pin, a spring hinge loaded to close, and the like. Where hinge connection 236 is a spring hinge loaded to close, outer sleeve 230 may be biased towards a closed position.

Outer sleeve 230 may pivotably open at hinge connection 236 to receive a securing block, such as securing block 110 and/or securing block 210, and may close at hinge connection 236 for outer sleeve 230 to couple with securing block 110 and/or securing block 210. Hinge connection 236 may promote coupling between outer sleeve 230 and securing block 110 and/or securing block 210 such that outer sleeve 230 may remain closed and may continue to be coupled to securing block 110, 210 when an object, such as a lifting device, is attached to adapter 100.

As depicted in FIG. 8 and FIG. 9, opening 238, similar to opening 132 of outer sleeve 130, may be an opening that may extend along the entire body of outer sleeve 230 such that the length of opening 238 may generally be the same as the length of the body of outer sleeve 230. In some embodiments, opening 238 may extend partially along outer sleeve 230 such that the length of opening 238 may be shorter than the length of the body of outer sleeve 230. Opening 238 may be sized for receiving existing support structure 118, or a securing block such as securing block 110, and/or securing block 210.

In some embodiments, opening 238 may be expanded by pivotably opening outer sleeve 230 for receiving existing support structure 118, or a securing block, such as securing blocks 110, 210.

In some embodiments, outer sleeve 230 may pivotably open to receive and couple with securing block 110 and/or securing block 210. In some embodiments, outer sleeve 230 may receive existing support structure 118, and may slidably couple with a securing block such as securing block 110 and/or securing block 210.

Similar to outer sleeve 130, sleeve channel surface 240 may be smoothed, polished or otherwise processed for contacting securing block 110, 210 when adapter 100 is in use.

Based on the shape and size of the securing block, such as securing blocks 110, 210, sleeve channel 242 may be similarly shaped and sized for receiving securing blocks 110, 210. For example, as illustrated in FIG. 1, FIG. 2, FIG. 6 and FIG. 7, securing blocks 110, 210 may have a generally frustoconical shape with a tapered outer surface. Sleeve channel 242 may be similarly tapered for receiving securing block 110, 210, as illustrated in FIG. 8 and FIG. 9.

Similar to outer sleeve 130, in some embodiments, the width of opening 238 when outer sleeve 230 is pivotably closed may be shorter than the width of sleeve channel 242, such that when an object is attached to attachment arm 244, outer sleeve 230 may not uncouple from securing blocks 110, 210 when adapter 100 is in use.

Similar to attachment arm 138, attachment arm 244 may allow an object to be attached to adapter 100 so that the object may be anchored to existing support structure 118. As illustrated in FIG. 8 and FIG. 9, attachment arm 244 may be a hoop for coupling with objects, such as lifting devices.

As depicted in FIG. 8 and FIG. 9, attachment arm 244 may be connected to second outer sleeve block 234. In some embodiments, attachment arm 244 may be connected to first outer sleeve block 232. In some embodiments, a first attachment arm may be connected to first outer sleeve block 232 and a second attachment arm may be connected to second outer sleeve block 234. In some embodiments, a first portion of attachment arm 244 may be connected to first outer sleeve block 232, and a second portion of attachment arm 244 may be connected to second outer sleeve block 234, such that when outer sleeve 230 is coupled with a securing block, such as securing block 110 and/or securing block 210, the first and second portions of attachment arm 244 define attachment arm 244.

As depicted in FIG. 4 and FIG. 5, adapter 100 may comprise a tapered securing block 110 coupled with outer sleeve 130 with a similarly tapered sleeve channel 136. When outer sleeve 130 and tapered securing block 110 are slidably coupled, outer sleeve 130 may be prevented from sliding past securing block 110.

Figure 10:
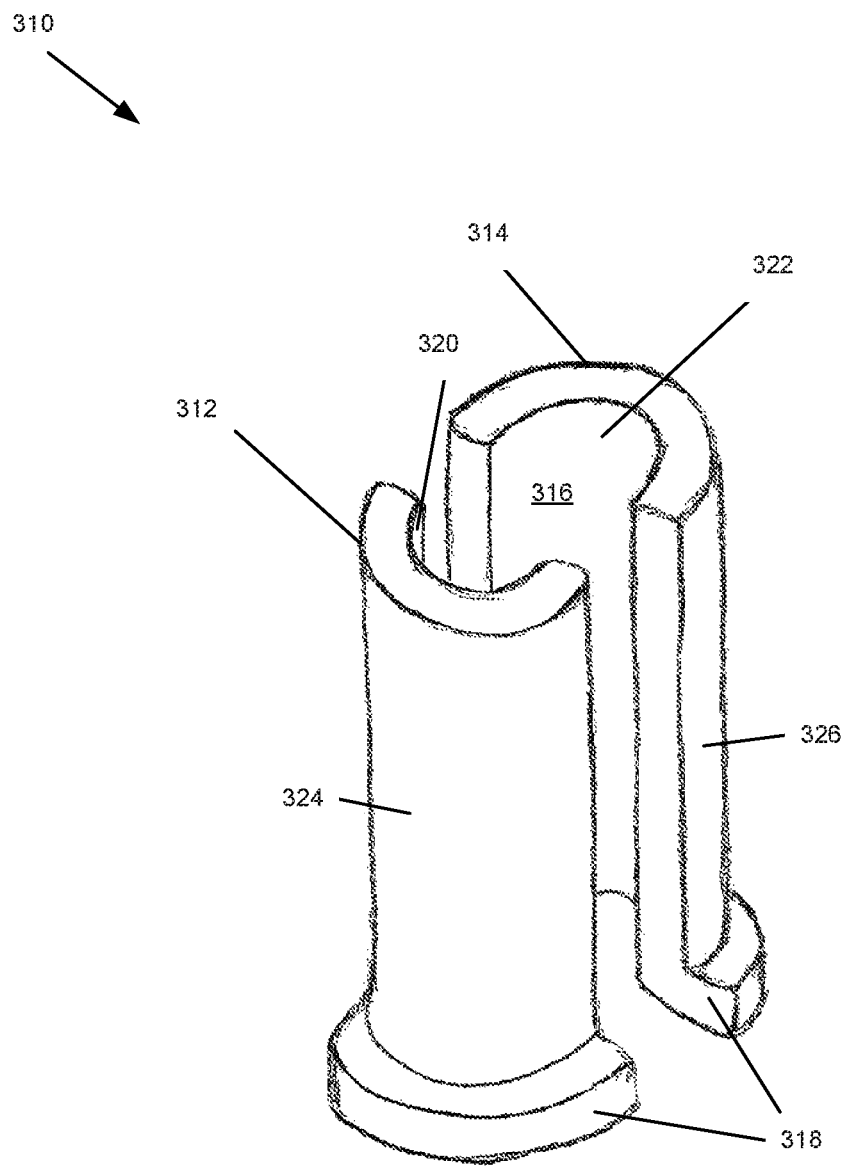
FIG. 10 is a perspective view of another securing block.
Figure 11:
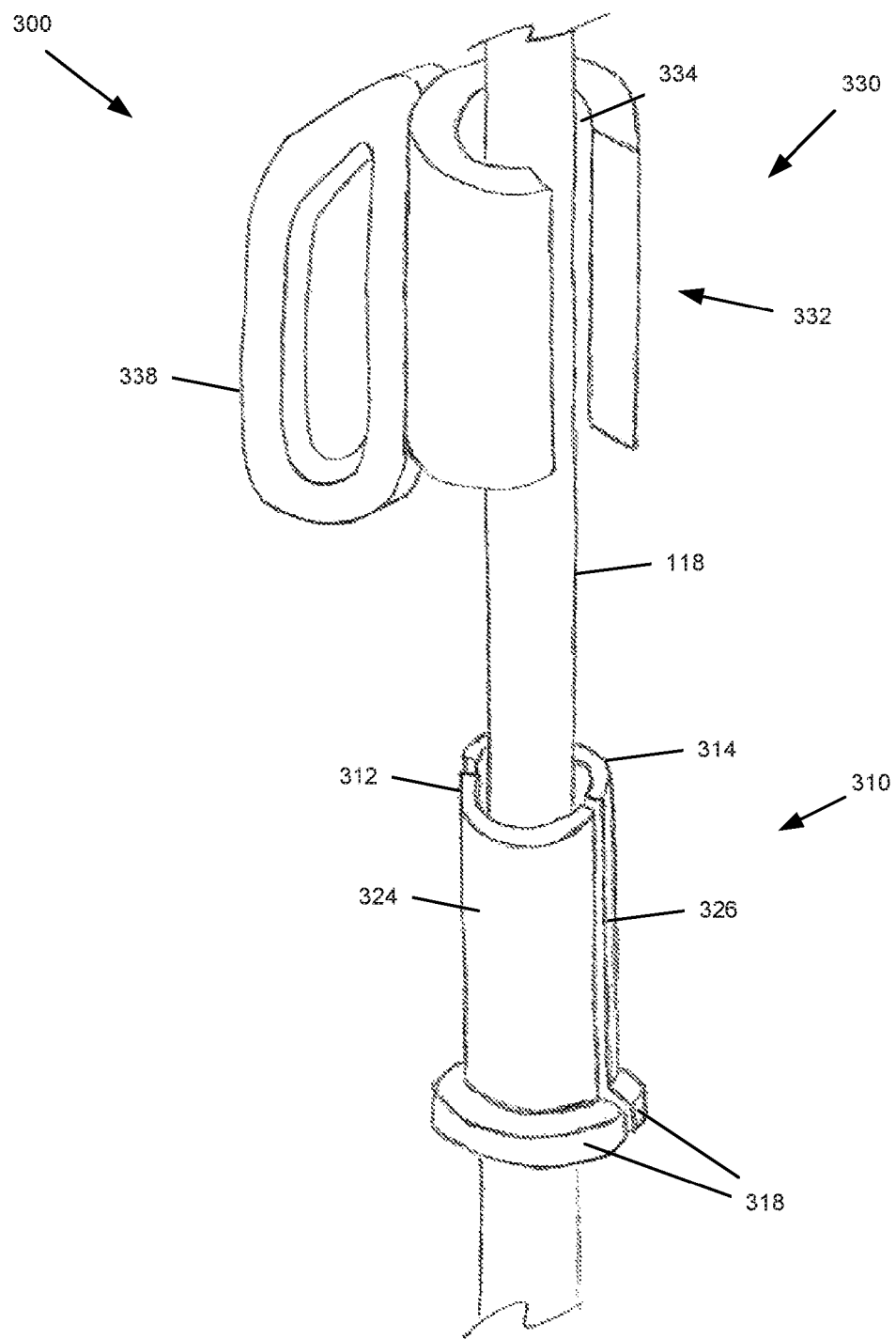
FIG. 11 is a schematic view of another outer sleeve and the securing block of FIG. 10 configured for securing to an existing support structure.

Other securing blocks and outer sleeves are possible for preventing outer sleeve 130 from sliding past securing block 110. FIG. 10 and FIG. 11 depict an example adapter 300 comprising a securing block 310 with a flange 318 and an outer sleeve 330.

As shown in FIG. 10, securing block 310 may comprise a first inner block 312 and a second inner block 314. When first inner block 312 and second inner block 314 are positioned in opposition, they may define a channel 316 generally similar to channels 116, 216 for receiving and securing to existing support structure 118. As illustrated in FIG. 10, securing block 310 may have a generally cylindrical shape.

Similar to securing blocks 110 and 210, first inner block 312 may comprise a first securing means 320 for securing first inner block 312 to existing support structure 118. Second inner block 314 may comprise a second securing means 322 for securing second inner block 314 to existing support structure 118.

First inner block 312 may comprise a first outer surface 324. Similarly, second inner block 314 may comprise a second outer surface 326. First outer surface 324 and second outer surface 326 may be smoothed or polished for contacting outer sleeve 330 when adapter 300 is in use.

Securing block 310 may be generally similar to securing blocks 110, 210, except at least one of first inner block 312 and second inner block 314 may comprise flange 318. As depicted in FIG. 10, both first inner block 312 and second inner block 314 may comprise flanges 318.

In some embodiments, first inner block 312 and second inner block 314 may be in hinged connection, similar to securing block 210 as depicted in FIG. 6 and FIG. 7. In some embodiments, securing block 310 comprising a hinged connection may be threaded from an exposed end of existing support structure 118 to secure onto existing support structure 118, for example, when existing support structure 118 is a threaded rod.

Outer sleeve 330 may comprise an opening 332, a sleeve channel surface 334 defining a sleeve channel 336, and an attachment arm 338 attached to an outer surface 340 of outer sleeve 330.

As depicted in FIG. 11, opening 332 may be an opening that may extend along the entire body of outer sleeve 330 such that the length of opening 332 may generally be the same as the length of the body of outer sleeve 330. In some embodiments, opening 332 may extend partially along outer sleeve 330 such that the length of opening 332 may be shorter than the length of the body of outer sleeve 330. Opening 332 may be sized for receiving existing support structure 118 and/or a securing block such as securing blocks 110, 210.

Sleeve channel surface 334 defining sleeve channel 336 may be smoothed, polished or otherwise processed for contacting securing blocks, such as securing blocks 110, 210, when adapter 300 is in use.

Based on the shape and size of securing block 310, sleeve channel 336 may be similarly shaped and sized for receiving and coupling with securing block 310. For example, as illustrated in FIG. 11, securing block 310 may have a generally cylindrical shape. Sleeve channel 336 may be similarly cylindrical for receiving and coupling with securing block 310.

In some embodiments, the width of opening 332 may be shorter than the width of sleeve channel 336.

Attachment arm 338 may allow an object to be attached to adapter 300 so that the object may be anchored to existing support structure 118. For example, attachment arm 338 may be an appropriate device for an object to attach to adapter 300, such as a cantilevered beam, rod, eyelet, and the like. As illustrated in FIG. 11, attachment arm 338 may be a hoop for coupling with objects, such as lifting devices.

Outer sleeve 330 may be generally similar to outer sleeves 130, 230, except sleeve channel 336 may be shaped and sized to accommodate securing block 310.

In some embodiments, outer sleeve 330 may comprise two or more sleeve blocks in hinged connection, similar to outer sleeve 230 as depicted in FIG. 8 and FIG. 9.

In some embodiments, adapter 300 may be used to anchor an object, such as a lifting device, to an existing support structure, such as a threaded rod.

First inner block 312 and second inner block 314 may be positioned onto existing support structure 118 such that existing supporting structure 118 is received in channel 316 of securing block 310. First securing means 320 and/or second securing means 322 may secure first inner block 312 and second inner block 314 onto existing support structure 118, or a user may hold first inner block 312 and second inner block 314 against existing support structure 118. Outer sleeve 330 may receive existing support structure 118 through opening 332. Outer sleeve 330 may couple with securing block 310 and may cause first securing means 320 and second securing means 322 to secure securing block 310 to existing support structure 118.

As depicted in FIG. 11, outer sleeve 330 may slidably couple with securing block 310. Flanges 318 may prevent outer sleeve 330 from sliding past securing block 310 when outer sleeve 330 and securing block 310 are coupled.

In some embodiments, existing support structure 118 may be a threaded rod and first securing means 320 and second securing means 322 may be threaded surfaces. When outer sleeve 330 is coupled with securing block 310, the threads of existing support structure 118 may engage and/or maintain engagement with the threads of the first securing means 320 and second securing means 322, such that adapter 300 is secured to existing support structure 118.

An object, such as a lifting device, may be coupled with attachment arm 338 such that the object is anchored to existing support structure 118. For example, a hook of a chain hoist may be hooked into the loop of attachment arm 138 to anchor the chain hoist to existing support structure 118, such as a threaded rod.

When an object is attached to attachment arm 338, outer sleeve 330 may be prevented from uncoupling with securing block 310 as the width of opening 332 may be shorter than the width of sleeve channel 336.

As described above, adapter 100, 300 may comprise securing block 110, 210, and/or 310 and outer sleeve 130, 230, and/or 330.

Figure 12:
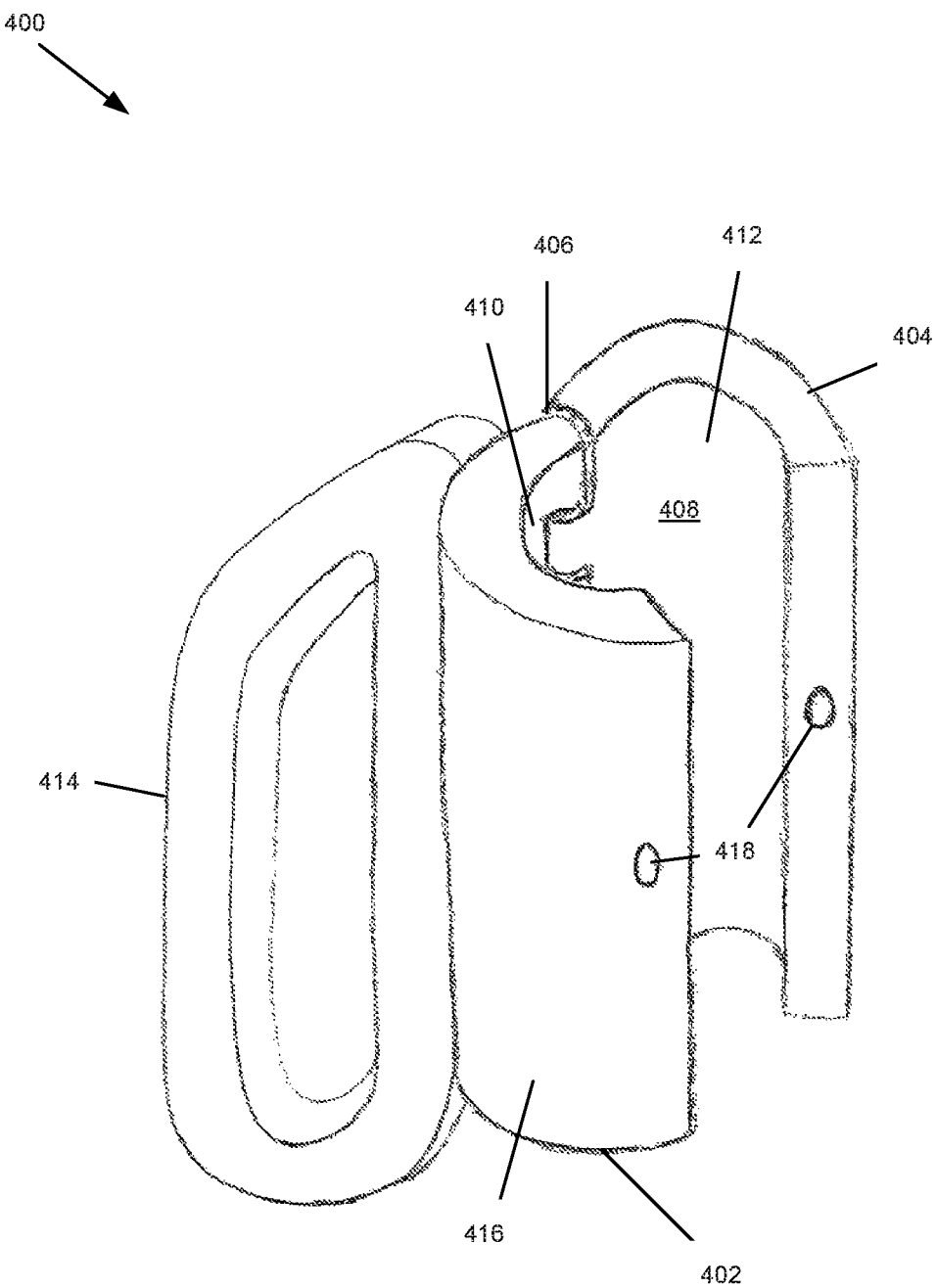
FIG. 12 is a perspective view of another adapter.
Figure 13:
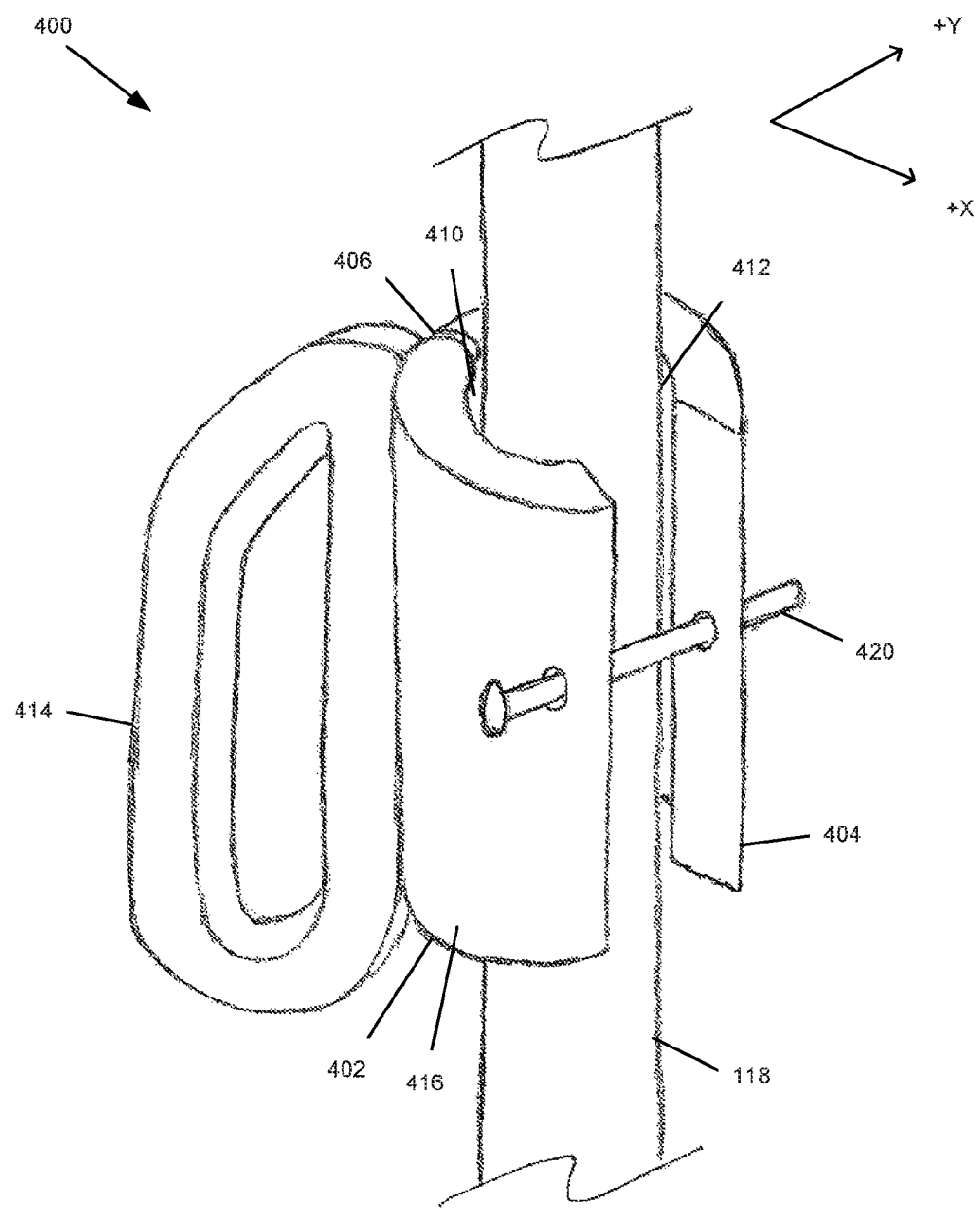
FIG. 13 is schematic view of the adapter of FIG. 12 secured to an existing support structure.

Other adapters are possible that may not include a securing block. FIG. 12 and FIG. 13 illustrate an example adapter 400 comprising a first adapter block 402 and a second adapter block 404 connected with a hinge connection 406. When first adapter block 402 and second adapter block 404 are positioned in opposition, they may define a channel 408 for receiving and securing adapter 400 to existing support structure 118.

As shown in FIG. 12 and FIG. 13, first adapter block 402 and second adapter block 404 may be connected to each other with hinge connection 406. Hinge connection 406 may be any appropriate hinge connection, such as a hinge and a pin, a spring hinge loaded to close, and the like. As depicted in FIG. 12 and FIG. 13, first adapter block 402 and second adapter block 404 may comprise complementary pin holes 418 for receiving a pin 420. Where hinge connection 406 is a spring hinge loaded to close, adapter 400 may be biased towards a closed position.

Hinge connection 406 may cause adapter 400 to pivotably open and close about hinge connection 406. Adapter 400 may pivotably open at hinge connection 406 to receive existing support structure 118 and may close at hinge connection 406 to secure adapter 400 to existing support structure 118.

In some embodiments, channel 408 may have a shape corresponding to the shape of existing support structure 118, such as conical, pyramidal, rectangular, hexagonal, octagonal, cylindrical, or the like. As depicted in FIG. 12 and FIG. 13, channel 408 may be generally cylindrical for receiving a generally cylindrical existing support structure 118, such as a threaded rod.

Channel 408 may be sized such that channel 408 may accommodate the size of existing support structure 118. For example, when existing support structure 118 is a threaded metal rod, channel 408 may be sized to accommodate standard diameters of threaded metal rods. In some examples, channel 408 may be sized to accommodate threaded metal rods with diameter ranging from 3/16 inches to 10 inches. In some examples, channel 408 may be sized to accommodate threaded rods with diameter ranging from 3/16 inches to 2 inches. The edges of channel 408 may be bevelled, rounded, chamfered, or otherwise smoothed for holding, gripping, or securing of adapter 400 and for receiving existing support structure 118.

First adapter block 402 may comprise a first securing means 410 for securing first adapter block 402 to existing support structure 118. Second adapter block 404 may comprise a second securing means 412 for securing second adapter block 404 to existing support structure 118. First securing means 410 and second securing means 412 may be any appropriate securing device for securing first adapter block 402 and second adapter block 404 to existing support structure 118, such as nails, screws, adhesives, mating surfaces for mating with existing support structure 118, and the like. In some embodiments, when existing support structure 118 is a threaded metal rod, first securing means 410 and second securing means 410 may be threaded surfaces with threads corresponding to the threads on existing support structure 118.

Adapter 400 may comprise an attachment arm 414 attached to outer surface 416 of adapter 400. Attachment arm 414 may allow an object to be attached to adapter 400 so that the object may be anchored to existing support structure 118. For example, attachment arm 414 may be an appropriate device for an object to attach to adapter 400, such as a cantilevered beam, rod, eyelet, and the like. As illustrated in FIG. 12 and FIG. 13, attachment arm 414 may be a hoop for coupling with objects, such as lifting devices.

As depicted in FIG. 12 and FIG. 13, attachment arm 414 is connected to first adapter block 402. In some embodiments, attachment arm 414 may be connected to second adapter block 404. In some embodiments, a first attachment arm may be connected to first adapter block 402 and a second attachment arm may be connected to second adapter block 404. In some embodiments, a first portion of attachment arm 414 may be connected to first adapter block 402, and a second portion of attachment arm 414 may be connected to second adapter block 234, such that when adapter 400 is secured to existing support structure 118, the first and second portions of attachment arm 414 define attachment arm 414.

Adapter 400 may be manufactured using appropriate manufacturing techniques. For example, adapter 400 may be cast, forged, 3D-printed, or machined entirely or partially from an appropriate material, such as stainless steel, aluminum, titanium, and the like. In some embodiments, attachment arm 414 may be separately cast, forged, 3D-printed, machined or otherwise manufactured and then later fastened to outer surface 416 of adapter 400 using appropriate fasteners, such as nuts and bolts, screws, adhesives, or welding.

In some embodiments, adapter 400 may be used to anchor an object, such as a lifting device, to an existing support structure, such as a threaded rod.

Adapter 400 may be pivotably opened about hinge connection 406. First adapter block 402 and second adapter block 404 may be positioned onto existing support structure 118 such that existing supporting structure 118 is received in channel 408.

First securing means 410 and second securing means 412 may secure first adapter block 402 and second adapter block 404 onto existing support structure 118.

Hinge connection 406 may promote securing first adapter block 402 and second adapter block 404 to existing support structure 118. For example, as depicted in FIG. 12 and FIG. 13, first adapter block 402 and second adapter block 404 may comprise complementary pin holes 418 for receiving pin 420 such that adapter 400 may remain closed and may continue to be secured to existing support structure 118 when an object is attached to adapter 400.

An object, such as a lifting device, may be attached to attachment arm 414 such that the object is anchored to existing support structure 118. For example, a hook of a chain hoist may be hooked into the loop of attachment arm 414 to anchor the chain hoist to existing support structure 118, such as a threaded rod.

In some embodiments, existing support structure 118 may be a threaded rod and first securing means 410 and second securing means 412 are threaded surfaces. Where existing support structure 118 is a threaded rod, and first securing means 410 and second securing means 412 are threaded surfaces, the threads of existing support structure 118 may engage and/or maintain engagement with the threads of the first securing means 410 and second securing means 412, such that adapter 400 is secured to existing support structure 118. Hinge connection 406 may promote engagement between the threads of existing support structure 118 and first securing means 410 and second securing means 412.

In some embodiments, where existing support structure 118 is a threaded rod, adapter 400 may be threaded from an exposed end of existing support structure 118 to secure onto existing support structure 118.

In some embodiments, similar to adapter 100 and adapter 300, adapter 400 may be used to anchor an object, such as a lifting device, to a newly installed support structure or an existing support structure. When adapter 400 is used to anchor an object to an existing support structure, this may reduce the amount of effort and/or time for moving an object. When adapter 400 is secured to an existing threaded rod in a ceiling to anchor a lifting device without having to install a new threaded rod, this may save the time and/or effort that would be allocated to installing the new threaded rod.

In some embodiments, adapter 400 may be used to secure onto any appropriate portion of an existing support structure. For example, adapter 400 may be used to secure to a proximal, distal, or middle portion of existing support structure 118, as shown in FIG. 13.

In some embodiments, adapter 400 may be used when a portion of an existing support structure is obscured, blocked, and/or impeded. For example, existing support structure 118 may be a threaded rod installed in a concrete ceiling. Adapter 400 may be secured onto an exposed end of the threaded rod. However, the exposed end of the threaded rod may be obscured, blocked, and/or impeded, for example, by new construction or installation projects. Adapter 400 may then be secured to a portion of the threaded rod that is not obscured, blocked, and/or impeded for anchoring an object to the threaded rod.

In some embodiments, adapter 400 may be secured to a portion of an existing support structure at an orientation convenient for the user. The orientation of adapter 400 may not be limited or restricted during use. Adapter 400 may receive and secure to any appropriate surface of existing support structure 118 at any appropriate and convenient orientation for the user. As depicted, attachment arm 414 may be oriented along the X-axis and generally pointed in the negative direction of the X-axis, as shown in FIG. 13. However, attachment arm 414 may be generally pointed in any direction on the X-Y plane at any appropriate and convenient direction to the user.

In some embodiments, adapter 400 may be used to secure an object to existing support structure 118 without an additional securing block, such as securing blocks 110, 210, 310. This may promote convenience when a user uses adapter 400. A user may use a single mechanical tool, namely adapter 400, to anchor an object to a support structure.

The preceding discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only. The invention is defined by the appended claims.

What is claimed is:

1. An adapter for anchoring an object to an existing support structure, the adapter comprising:
   a securing block comprising a first inner block, a second inner block complementary to the first inner block, the first and second inner blocks defining a channel therethrough when placed in opposition for receiving and securing to the existing support structure, the first inner block comprising a first securing means and the second inner block comprising a second securing means; and
   an outer sleeve for coupling to the securing block, having:
      an opening to receive the existing support structure;
      a sleeve channel for receiving the securing block; and
      an attachment arm attached to an outer surface of the outer sleeve for anchoring the object;
   wherein the outer sleeve coupling with the securing block causes the first securing means and the second securing means to secure the securing block to the existing support structure.

2. The adapter of claim 1, wherein at least one of the first inner block and the second inner block includes a flange to support the outer sleeve when the outer sleeve is coupled with the securing block.

3. The adapter of claim 1, wherein the first inner block and the second inner block are in hinged connection.

4. The adapter of claim 3, wherein the hinged connection connecting the first inner block and the second inner block is a hinge and a pin.

5. The adapter of claim 3, wherein the hinged connection connecting the first inner block and the second inner block is a spring hinge loaded to close.

6. The adapter of claim 1, wherein:
the existing support structure is a threaded rod; and
the first securing means and the second securing means are threaded surfaces that define the channel.

7. The adapter of claim 1, wherein the outer sleeve comprises a first outer sleeve block opposing a second outer sleeve block in hinged connection that define the sleeve channel.

8. The adapter of claim 7, wherein the hinged connection connecting the first outer sleeve block and the second outer sleeve block is a hinge and a pin.

9. The adapter of claim 7, wherein the hinged connection connecting the first outer sleeve block and the second outer sleeve block is a spring hinge loaded to close.

10. The adapter of claim 1, wherein the outer sleeve and securing block are slidably coupled.

11. The adapter of claim 10, wherein:
an outer surface of the securing block is tapered;
the sleeve channel of the outer sleeve is tapered for slidably coupling with the securing block; and
wherein when the outer sleeve and securing block are slidably coupled, the corresponding tapers prevent the outer sleeve from sliding past the securing block.

12. An adapter for anchoring an object to an existing support structure, the adapter comprising:
a first adapter block opposing a second adapter block in hinged connection defining a channel therethrough for receiving and securing to the existing support structure, the first adapter block comprising a first securing means and the second inner block comprising a second securing means; and
an attachment arm attached to an outer surface of the adapter for anchoring the object;
wherein:
the existing support structure is a threaded rod; and
the first securing means and the second securing means are threaded surfaces that define the channel.

13. The adapter of claim 12, wherein the hinged connection connecting the first adapter block and the second adapter block is a hinge and a pin.

14. The adapter of claim 12, wherein the hinged connection connecting the first adapter block and the second adapter block is a spring hinge loaded to close.

15. An adapter for anchoring an object to an existing support structure, the adapter comprising:
a securing block comprising a first inner block, a second inner block complementary to the first inner block, the first and second inner blocks defining a channel therethrough when placed in opposition for receiving and securing to the existing support structure, the first inner block comprising a first securing means and the second inner block comprising a second securing means; and
an outer sleeve for coupling to the securing block, having:
an opening to receive the existing support structure;
a sleeve channel for receiving the securing block; and
an attachment arm attached to an outer surface of the outer sleeve for anchoring the object;
wherein the outer sleeve and securing block are slidably coupled.

* * * * *